United States Patent
Harris et al.

(10) Patent No.: US 7,741,401 B2
(45) Date of Patent: Jun. 22, 2010

(54) THICKENER BLEND COMPOSITION AND METHOD FOR THICKENING AQUEOUS SYSTEMS

(75) Inventors: Jerome Michael Harris, Penllyn, PA (US); Barrett Richard Bobsein, Sellersville, PA (US)

(73) Assignee: Rohm and Haas Company, Philadelphia, PA (US)

(*) Notice: Subject to any disclaimer, the term of this patent is extended or adjusted under 35 U.S.C. 154(b) by 63 days.

(21) Appl. No.: 12/077,573

(22) Filed: Mar. 20, 2008

(65) Prior Publication Data

US 2008/0234425 A1    Sep. 25, 2008

Related U.S. Application Data

(60) Provisional application No. 60/919,209, filed on Mar. 21, 2007, provisional application No. 61/009,153, filed on Dec. 26, 2007.

(51) Int. Cl.
*C08G 18/42* (2006.01)
*C08G 67/02* (2006.01)

(52) U.S. Cl. ...................... 524/500; 524/612

(58) Field of Classification Search ................ 524/500
See application file for complete search history.

(56) References Cited

U.S. PATENT DOCUMENTS

| | | | |
|---|---|---|---|
| 4,155,892 A * | 5/1979 | Emmons et al. | ............. 524/507 |
| 4,496,708 A | 1/1985 | Dehm et al. | |
| 4,514,552 A | 4/1985 | Shay et al. | |
| 5,192,592 A | 3/1993 | Shay | |
| 5,376,709 A | 12/1994 | Lau | |
| 6,063,857 A | 5/2000 | Greenblatt | |
| 7,125,919 B2 | 10/2006 | Harris | |
| 7,217,443 B2 | 5/2007 | Bobsein et al. | |
| 2003/0166822 A1 | 9/2003 | Benard et al. | |
| 2006/0106153 A1 * | 5/2006 | Blankenship et al. | ....... 524/500 |
| 2007/0161745 A1 | 7/2007 | Coutelle | |

FOREIGN PATENT DOCUMENTS

GB    870994    6/1961

* cited by examiner

*Primary Examiner*—Ling-Siu Choi
*Assistant Examiner*—Hui Chin
(74) *Attorney, Agent, or Firm*—Andrew G. Bunn

(57) ABSTRACT

A thickener blend composition, and method for thickening aqueous systems, comprising an associative thickener wherein the same group that is attached to or within the backbone of the associative thickener is reversibly switched between being hydrophilic and hydrophobic in nature. When the group that is attached to or within the backbone is rendered hydrophilic, the aqueous thickener is pourable and readily incorporated into aqueous polymer compositions. When this group is rendered hydrophobic, the thickener performs its thickening function efficiently. Switching is readily accomplished by adjusting the pH of the associative thickener composition and the aqueous polymer composition being thickened.

12 Claims, No Drawings

THICKENER BLEND COMPOSITION AND METHOD FOR THICKENING AQUEOUS SYSTEMS

This invention claims priority to U.S. Provisional Application Nos. 60/919,209 filed Mar. 21, 2007, 61/009,153 filed Dec. 26, 2007, and U.S. application Ser. No. 11/974,071 filed Oct. 11, 2007.

BACKGROUND

This invention relates to blends of aqueous thickener polymer compositions, and their method of use. In particular, one aspect of this invention relates to aqueous blends of associative thickeners, which are soluble in water over a broad pH range, with alkali soluble or alkali swellable emulsions, with or without hydrophobic modification (HASE or ASE thickeners respectively), in their low pH, insoluble, emulsion form.

Aqueous polymer systems, for example coatings containing emulsion polymer binders, typically use thickeners to obtain the desired degree of viscosity needed for the proper formulation and application of the aqueous system. One general type of thickener used in aqueous polymer systems is referred to in the art by the term "associative." Associative thickeners are so called because the mechanism by which they thicken is believed to involve hydrophobic associations between the hydrophobic moieties in the thickener molecules and/or between the hydrophobic moieties in the thickener molecules and other hydrophobic surfaces. Associative thickeners typically are water soluble over a broad pH range of from 2 to 10, and are thus relatively pH-independent. Hydrophobically modified ethoxylated urethane thickeners (HEUR thickeners) are examples of associative thickeners with pH-independent solubility.

Another type of thickener used in aqueous polymer systems is referred to in the art as an alkali soluble or alkali swellable emulsion thickener, which thickens aqueous polymer systems effectively at pH values of 6 and greater because they are typically water insoluble at pH values of less than 6 and water soluble at pH values of greater than 6. The alkali soluble or alkali swellable emulsion thickeners are typically provided in the emulsion form at pH values below 5. At this low pH, the viscosity of the product is acceptable and product solids by weight can typically be in the range of 30% to 50%. Alkali soluble or alkali swellable emulsion thickeners that contain no hydrophobic groups and thicken by a non-associative mechanism upon neutralization with base are described in the art as ASE thickeners. Alkali soluble or alkali swellable emulsion thickeners that are hydrophobically modified and thicken at least partially by an associative mechanism upon neutralization with base are described in the art as HASE thickeners. As used herein, however, the terms ASE and HASE are not restricted to just the emulsion form of these polymers.

Thickeners are typically sold as pourable aqueous liquids. For ease of use, it is desirable for the viscosity (Brookfield at 6 rpm) of such thickener products to be less than 15,000 centipoise (cps), or even less than 5,000 cps, so that the product will readily drain from its storage container, and be readily incorporated into the aqueous system to which it is added. The viscosity of the aqueous thickener product can be decreased by reducing the active solids concentration, but this has the drawback of limiting formulation latitude in terms of weight solids of the aqueous system to be thickened by the product.

To provide a balance of properties that cannot be provided by a single thickener, it is desirable to be able to blend two or more different thickeners into a single product. For instance, U.S. Patent Application Publication No. US 2007/0161745A1 discloses blending a multiplicity of different HEUR thickeners to provide a unique balance of high shear rate and low shear rate viscosity enhancements.

U.S. Pat. No. 7,125,919 discloses blends of thickeners and includes the combination of HASE thickeners with HEUR thickeners. However, the embodiment also requires that the composition comprise at least one macromolecular organic compound having a hydrophobic cavity, such as a cyclodextrin compound. Unfortunately, the cyclodextrin component adds significant cost to the blend composition.

It would be useful to supply aqueous blends of pH-independent soluble associative thickeners with ASE and/or HASE thickeners at a viscosity that can be handled and poured readily without incurring the additional cost of the cyclodextrin compound. Thickeners with pH-independent solubility commonly provide much better flow and leveling in coatings than do ASE or HASE thickeners. It would be useful to improve the flow and leveling performance of ASE or HASE thickener products by providing them as a blend with a pH-independent soluble associative thickener. However, to date it has not been possible to blend pH-independent soluble associative thickeners with ASE or HASE thickeners in their low pH emulsion form at practical weight solids because the viscosity of the aqueous blend is exceedingly high, essentially existing as a gel. Thus, there remains a need in the art for inexpensive pourable blends of HASE or ASE and pH-independent soluble associative thickeners with both low viscosity and the highest active thickener solids possible.

STATEMENT OF THE INVENTION

The present invention provides an aqueous thickener blend composition comprising:

A) an aqueous acid-suppressible associative thickener polymer composition comprising, based on the weight of the aqueous acid-suppressible thickener composition:

(a) 1% to 60% by weight of an acid-suppressible associative thickener having a backbone comprising a polyoxyalkylene, a polysaccharide, or a polyvinyl alcohol, said acid-suppressible associative thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine;

(b) sufficient acid to substantially protonate the secondary amine, or the tertiary amine, or the tertiary phosphine, or combination thereof;

(c) 40% to 99% by weight of water; and (d) 0% to 15% by weight of an organic co-solvent, surfactant, cyclodextrin compound, or any combination thereof, as a viscosity-suppressing additive; and B) A thickener selected from the group consisting of an hydrophobically modified alkali soluble or alkali swellable thickener (HASE), an alkali soluble or alkali swellable thickener without hydrophobic modification (ASE), and mixtures thereof.

The present invention further provides an aqueous thickener blend composition comprising:

A) an aqueous acid-suppressible associative thickener polymer composition comprising, based on the weight of the aqueous acid-suppressible thickener composition:

(a) 1% to 60% by weight of an acid-suppressible associative thickener comprising a substantially non-ionic water soluble backbone and a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine;

(b) sufficient acid to substantially protonate the secondary amine, or the tertiary amine, or the tertiary phosphine, or combination thereof;

(c) 40% to 99% by weight of water; and (d) 0% to 15% by weight of an organic co-solvent, surfactant, cyclodextrin compound, or any combination thereof, as a viscosity-suppressing additive; and B) a thickener selected from the group consisting of an hydrophobically modified alkali soluble or alkali swellable thickener (HASE), an alkali soluble or alkali swellable thickener without hydrophobic modification (ASE), and mixtures thereof.

The present invention further provides an aqueous thickener blend composition comprising:

A) an aqueous acid-suppressible associative thickener polymer composition comprising, based on the weight of the aqueous acid-suppressible thickener composition:

(a) 1% to 60% by weight of an acid-suppressible associative thickener comprising a substantially non-ionic water soluble backbone comprising a polyoxyalkylene, a poly(meth)acrylamide, a polysaccharide, or a polyvinyl alcohol, or a copolymer comprising esters of (meth)acrylic acid, said acid-suppressible associative thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine;

(b) sufficient acid to substantially protonate the secondary amine, or the tertiary amine, or the tertiary phosphine, or combination thereof;

(c) 40% to 99% by weight of water; and (d) 0% to 15% by weight of an organic co-solvent, surfactant, cyclodextrin compound, or any combination thereof, as a viscosity-suppressing additive; and B) a thickener selected from the group consisting of an hydrophobically modified alkali soluble or alkali swellable thickener (HASE), an alkali soluble or alkali swellable thickener without hydrophobic modification (ASE), and mixtures thereof.

The present invention further provides a method to increase the viscosity of an aqueous polymer system, comprising:

(a) combining the aqueous polymer system with an aqueous thickener blend composition, wherein the aqueous thickener blend composition comprises:

A) an aqueous acid-suppressible associative thickener polymer composition comprising, based on the weight of the aqueous acid-suppressible thickener composition:

(i) 1% to 60% by weight of an acid-suppressible associative thickener having a backbone comprising a polyoxyalkylene, a polysaccharide, or a polyvinyl alcohol, said acid-suppressible associative thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine;

(ii) sufficient acid to substantially protonate the secondary amine, or the tertiary amine, or the tertiary phosphine, or combination thereof;

(iii) 40% to 99% by weight of water; and (iv) 0% to 15% by weight of an organic co-solvent, surfactant, cyclodextrin compound, or any combination thereof, as a viscosity-suppressing additive; and B) A thickener selected from the group consisting of an hydrophobically modified alkali soluble or alkali swellable thickener (HASE), an alkali soluble or alkali swellable thickener without hydrophobic modification (ASE), and mixtures thereof; and (b) adding an amount of a base sufficient to substantially deprotonate the protonated secondary amine, or protonated tertiary amine, or protonated tertiary phosphine, or combination thereof.

The present invention further provides a polymer composition, comprising in admixture, (a) an aqueous polymer system; and (b) an aqueous thickener blend composition comprising:

A) an aqueous acid-suppressible associative thickener polymer composition comprising, based on the weight of the aqueous acid-suppressible thickener composition:

(i) 1% to 60% by weight of an acid-suppressible associative thickener having a backbone comprising a polysaccharide, or a polyvinyl alcohol, said acid-suppressible associative thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine;

(ii) 40% to 99% by weight of water; and (iii) 0% to 15% by weight of an organic co-solvent, surfactant, cyclodextrin compound, or any combination thereof;

wherein the secondary amine, or the tertiary amine, or the tertiary phosphine, or combination thereof, are substantially unprotonated; and B) a thickener selected from the group consisting of an hydrophobically modified alkali soluble or alkali swellable thickener (HASE), an alkali soluble or alkali swellable thickener without hydrophobic modification (ASE), and mixtures thereof.

The present invention further provides a polymer composition, comprising in admixture: (1) an aqueous polymer system; and (2) an aqueous thickener blend composition comprising:

A) an aqueous acid-suppressible associative thickener polymer composition comprising, based on the weight of the aqueous acid-suppressible thickener composition:

(a) 1% to 60% by weight of an acid-suppressible associative thickener having a backbone comprising a polyoxyalkylene segment greater than 10 oxyalkylene units in length and one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing, or wherein the acid-suppressible associative thickener is a hydrophobically modified cellulosic polymer; said acid-suppressible associative thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine;

(b) 40% to 99% by weight of water; and (c) 0% to 15% by weight of an organic co-solvent, surfactant, cyclodextrin compound, or any combination thereof;

wherein the secondary amine, or the tertiary amine, or the tertiary phosphine, or combination thereof, are substantially unprotonated; and B) a thickener selected from the group consisting of an hydrophobically modified alkali soluble or alkali swellable thickener (HASE), an alkali soluble or alkali swellable thickener without hydrophobic modification (ASE), and mixtures thereof.

DETAILED DESCRIPTION

The present invention relates to blends of certain associative thickeners, referred to herein as "acid-suppressible thickener(s)", with HASE or ASE type thickeners. Included in this invention are blends of certain acid-suppressible associative HEUR thickeners with HASE or ASE type thickeners. The inventive blends can be readily transported and added to aqueous formulations at pourable viscosities.

HASE and ASE thickeners are well-known in the art (*Journal of Coatings Technology Research*, Shay, Vol. 2, No. 6, April, 2005), and are not limited in their use in the inventive blends described herein. Examples of commercially available HASE and ASE thickeners include, without limitation, Acrysol™ RM-5 or Acrysol™ TT-935 (both available from Rohm and Haas Company, Philadelphia, Pa., USA), or the UCAR™ Polyphobe™ line of thickeners (from Dow Chemical, Midland, Mich., USA) as well as Acrysol™ ASE-60 (from Rohm and Haas Company, Philadelphia, Pa., USA) and Alcogum™ L-28 (from Alco Chemical Company, Chatanooga, Tenn., USA). Methods of making such thickeners are also well-known in the art. See, for example, U.S. Pat. No. 4,514,552, U.S. Pat. No. 5,192,592, British Patent No. 870,994, and U.S. Pat. No. 7,217,443.

The inventive thickener blend composition comprises an acid-suppressible associative thickener. The thickener blend composition comprises an acid-suppressible thickener in which the same group that is attached to or within the backbone of the thickener is reversibly switched between being hydrophilic and hydrophobic in nature. When the group that is attached to or within the backbone is rendered hydrophilic, the aqueous acid-suppressible thickener is pourable and readily incorporated into aqueous polymer compositions. When this group is rendered hydrophobic, the thickener performs its thickening function efficiently. Switching is readily accomplished by adjusting the pH of the acid-suppressible thickener composition and the aqueous polymer composition being thickened.

It is believed in the art that the associative mechanism of thickening arises from the structure of associative thickener polymers, which contain distinct hydrophilic and hydrophobic groups. The hydrophilic groups impart overall water solubility to the polymer molecule. The hydrophobic groups associate with other hydrophobic groups on other thickener molecules or on latex particle surfaces to form a dynamic three-dimensional network structure of micelles containing thickener hydrophobic groups. Although the associations in this network are dynamic, interaction lifetimes can be long enough to provide viscosity to the system depending upon the applied shear rate.

As disclosed in U.S. Pat. No. 4,496,708, the "micellar bridging" theory is based upon the existence within the aqueous phase of intermolecular, micelle-like associations between the hydrophobic groups bonded to the water soluble polymer. In the broadest characterization, the term "micelle-like association" is intended to mean the approximate aggregation of at least two hydrophobic groups serving to exclude water. The greater effective lifetime of the micelle-like association yields a stronger network and a higher observed viscosity, that is, greater thickening efficiency. The duration of time that an individual micelle-like association exists is related to the chemical potential of the hydrophobic group as compared to its aqueous environment and steric factors, such as the proximity of one hydrophobic group to another, which aid the approach of two or more hydrophobic groups to each other. The chemical potential of the hydrophobic group as compared to its aqueous environment is directly related to the solubility parameter of the hydrophobic group in water. When the hydrophobic group is less soluble in water, there is a greater driving force for micelle-like association, and thus the network lifetime is greater and the observed viscosity is greater. When the hydrophobic group is more soluble in water, there is a reduced driving force for micelle-like association, and thus the network lifetime is shorter and the observed viscosity is less.

In the acid-suppressible thickener polymers used in the present inventive blends, the water solubility parameters of select hydrophobic groups on the acid-suppressible thickener are modulated by controlling the pH of the thickener's aqueous environment. Many aqueous systems of commercial importance are supplied at pH values above about 8. The inventive acid-suppressible thickeners described herein deliver better thickening efficiency at pH values above about 8, i.e., the select hydrophobic groups exist in their least water soluble form at pH values above about 8. In the aqueous product as supplied at pH values less than about 6 and more than about 2.5, the thickener's efficiency is suppressed because the select hydrophobic groups exist in a more water soluble form. Thus, the novel associative thickener compositions are supplied at desirably low viscosities and at practical active solids concentrations. However, these acid-suppressible thickener compositions thicken aqueous systems very effectively if the pH of the aqueous system is adjusted to above about 8.

Most secondary and tertiary amines, as well as some tertiary phosphines, can be protonated at aqueous pH values below about 6. Primary amines, as components of hydrophobic groups, tend to require pH values well above about 8 to deprotonate from their acid form. Thus, primary amines can generally be characterized as too basic to be useful as a component of the acid-suppressible thickener hydrophobic groups. Nitrogen atoms that are characterized as urea or urethanes tend to not be basic enough. That is, urea and urethane functionalities tend to require a pH value below about 2.5 to exist in the protonated form. At these low pH values, the associative thickener's polyether backbone is more prone to acid catalyzed degradation. Because of degradation during storage, polyether associative thickeners with pH values below about 2.5 are not desirable. Within the range of 2.5 to 6.0, a pH of 2.5 to 5.0 or 3.0 to 4.5 can be used.

The following discussion concerning pH and $pK_a$ is applicable to secondary amines, or tertiary amines, or tertiary phosphines attached to or within the acid-suppressible thickener backbone. The concentration of the protonated secondary or tertiary amine, that is, the conjugate acid form of the amine, is defined as [HA+]. The concentration of the unprotonated secondary or tertiary amine, that is, the base form of the amine, is defined as [A]. The concentration of protons in solution is defined as [H+]. The acidity constant of the acid form of the amine, $K_a$, can be defined as follows (see, for example, Hendrickson, Cram and Hammond, *Organic Chemistry*, Third Edition, McGraw-Hill, pp 301-302, (1970)).

$$K_a = [H+][A]/[HA+]$$

Furthermore, the $pK_a$ of the secondary or tertiary amine and the pH of the aqueous associative thickener composition can be defined as follows.

$$pK_a = -\log K_a$$

$$pH = -\log [H+]$$

A useful relationship is that when [HA+] equals [A], the pH of the solution will have a value equal to the $pK_a$. Therefore, at pH values less than the amine's $pK_a$, the concentration of the protonated form of the amine will exceed the concentration of the unprotonated form of the amine. The aqueous associative thickener composition must contain sufficient organic or inorganic acid to reduce the pH of the aqueous associative thickener composition below the value of the $pK_a$ of the secondary or tertiary amine functionalities which comprise the acid-suppressible thickener's hydrophobic groups thereby substantially protonating said secondary or tertiary amines. When the aqueous acid-suppressible associative thickener composition is added to the aqueous system to be thickened, the final pH value of the thickened system should be higher than the $pK_a$ of the secondary or tertiary amine group to substantially deprotonate the protonated hydrophobic amine groups. Thus, a method to increase the viscosity of an aqueous polymer composition comprises combining an aqueous polymer system with an aqueous acid-suppressible associative thickener composition, said acid-suppressible associative thickener further comprising a plurality of hydrophobic groups wherein one or more of said hydrophobic groups comprises a secondary amine, or a tertiary amine, or a tertiary phosphine, or combination thereof, and optionally a quaternary amine, with the proviso that less than 80% of the total amine functionality is a quaternary amine, and where the acid-suppressible aqueous associative thickener composition is provided at a pH below that of the $pK_a$ of the secondary amine, or tertiary amine, or tertiary phosphine, or combination thereof, followed by the addition of an amount of base sufficient to raise the pH of the aqueous polymer composition above the $pK_a$ of the secondary amine, or tertiary amine, or tertiary phosphine, or combination thereof, to substantially deprotonate the protonated secondary amine, or protonated tertiary amine, or protonated tertiary phosphine, or combination thereof. The hydrophobic amine or phosphine groups of the acid-suppressible associative thickener comprising the thickened aqueous polymer composition are substantially deprotonated when the pH of the thickened aqueous polymer composition exceeds the $pK_a$ of the secondary amine, or tertiary amine, or tertiary phosphine, or combination thereof, of the acid-suppressible associative thickener. The alternative "or" expression also encompasses the "and" combination and is used interchangeably.

The $pK_a$ value of the amine or phosphine functionalities in the hydrophobic groups can be experimentally determined by the following method. Disperse 25 gms of thickener solids homogeneously in approximately 975 gms of water and sufficient phosphoric acid to provide 1000 gms of aqueous thickener composition of 2.5% weight thickener solids at pH=4. A mechanical stirrer, a pH meter probe, and a Brookfield viscometer can be simultaneously mounted over the vessel to provide agitation, pH measurement and viscosity measurement of the aqueous composition. Temperature should be 25° C. The stirrer should be turned off while pH measurements and viscosity measurements are recorded. The pH of the aqueous composition is adjusted stepwise upwards with 10% aqueous ammonia until a maximum pH of about 10.5 is obtained. After each aliquot of ammonia is added, the composition is stirred for 5 minutes, and then pH and viscosity are measured. Viscosity in centipoise is measured at 60 rpm and spindle #3, although more viscous titrations may require 60 rpm or lesser speeds with spindle #4 to keep the viscometer readout on scale. The viscosity is plotted on a linear scale versus the pH on a linear scale. At low and high pH values, the viscosity of the aqueous composition is relatively independent of pH. At the intermediate pH values, the viscosity is more dependent upon pH. The viscosity value at the high pH end of titration curve where the viscosity starts to become relatively independent of pH is assigned as the maximum viscosity value. The point on the titration curve corresponding to half of the maximum viscosity value is defined as the midpoint of the titration. The $pK_a$ for the amine or phosphine functionalities comprising the hydrophobic groups of the associative thickener is defined as the pH value associated with the midpoint of the titration.

Aqueous acid-suppressible associative thickeners for use in the compositions and methods described herein accordingly comprise a hydrophilic backbone comprising a plurality of hydrophobic groups attached to or within the backbone, wherein at least one of the hydrophobic groups comprises a secondary amine, or a tertiary amine, or a tertiary phosphine, or a combination thereof, and optionally a quaternary amine.

The hydrophilic backbone of the acid-suppressible associative thickener can take a variety of forms, for example, the backbone can be linear, branched, or crosslinked. A variety of different types of backbones can be used, for example a polyether such as a polyoxyalkylene, a polyacrylamide, a polymethacrylamide, a polysaccharide, a polyvinyl alcohol, a polyvinyl alkyl ether, or a polyvinyl pyrrolidone. The polyacrylamide and polymethacrylamide may collectively be referred to as poly(meth)acrylamide. In one embodiment, the hydrophilic backbone comprises a (co)polymer comprising esters of acrylic acid or esters of methacrylic acid. Again, acrylic acid and methacrylic acid may collectively be referred to as (meth)acrylic acid and the related esters may collectively be referred to as esters of (meth)acrylic acid, or as (meth)acrylates. Preferably, the backbone is non-ionic. Examples of suitable esters of (meth)acrylic acid include hydroxyethyl(meth)acrylate, that is, HEA or HEMA.

In one embodiment the backbone is a polysaccharide based on a cellulosic backbone, for example a hydroxy ethyl cellulose backbone. Thus, the aqueous thickener blend composition may comprise an acid-suppressible associative thickener having a backbone comprising one or more saccharide segments greater than 10 saccharide units in length.

In another embodiment, a polyether associative thickener is based on building blocks of polyoxyalkylene segments, for example polyethylene glycol building blocks. For example, the aqueous thickener blend composition may comprise an acid-suppressible associative thickener having a backbone comprising one or more polyoxyalkylene segments greater than 10 oxyalkylene units in length. As used herein, the term "oxyalkylene" refers to units having the structure —(O-A)-, wherein O-A represents the monomeric residue of the polymerization reaction product of a $C_{2-8}$ alkylene oxide. Examples of oxyalkylenes include, but are not limited to: oxyethylene with the structure —$(OCH_2CH_2)$—; oxypropylene with the structure —$(OCH(CH_3)CH_2)$—; oxytrimethylene with the structure $\{OCH_2CH_2CH_2\}$; and oxybutylene with the general structure —$(OC_4H_8)$—. Polymers containing these units are referred to as "polyoxyalkylenes." The polyoxyalkylene units can be homopolymeric or copolymeric. Examples of homopolymers of polyoxyalkylenes include, but are not limited to polyoxyethylene, which contains units of oxyethylene; polyoxypropylene, which contains units of oxypropylene; polyoxytrimethylene, which contains units of oxytrimethylene; and polyoxybutylene, which contains units of oxybutylene. Examples of polyoxybutylene include a homopolymer containing units of 1,2-oxybutylene, —$(OCH(C_2H_5)CH_2)$—; and polytetrahydrofuran, a homopolymer containing units of 1,4-oxybutylene, —$(OCH_2CH_2CH_2CH_2)$—.

Alternatively, the polyoxyalkylene segments can be copolymeric, containing two or more different oxyalkylene units. The different oxyalkylene units can be arranged randomly to form a random polyoxyalkylene; or can be arranged in blocks to form a block polyoxyalkylene. Block polyoxyalkylene polymers have two or more neighboring polymer blocks, wherein each of the neighboring polymer blocks contain different oxyalkylene units, and each polymer block contains at least two of the same oxyalkylene units. Oxyethylene is the preferred oxyalkylene segment.

In still another embodiment, polyoxyalkylene segments are linked with non-polyoxyalkylene segments or linkages. When the polyoxyalkylene units are linked with a multi-functional isocyanate, a hydrophobically modified polyurethane polyether associative thickener is generated as is known in the art. These acid-suppressible thickeners can also contain urea linkages, ester linkages or ether linkages other than those linking the polyoxyalkylene units. The multi-functional isocyanates can be aliphatic, cycloaliphatic, or aromatic; and can be used singly or in admixture of two or more, including mixtures of isomers. Examples of suitable organic polyisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, 1,5-tetrahydronaphthylene diisocyanate, hexamethylene diisocyanate trimer, hexamethylene diisocyanate biuret, and triphenylmethane-4,4',4"-triisocyanate. When the polyoxyalkylene segments are linked with a gem-dihalide reagent, hydrophobically modified polyacetal polyether and polyketal polyether associative thickeners are generated that are acid-suppressible. Suitable gem-dihalide reagents include dihalogenomethanes, such as dibromomethane and dichloromethane; 1,1-dichlorotoluene, 1,1-dichloroethane, and 1,1-dibromomethane. When the polyoxyalkylene units are linked with an aminoplast reagent, a hydrophobically modified acid-suppressible polyaminoplast polyether associative thickener is generated. When polyoxyalkylene units are linked with an epihalohydrin or trihaloalkane reagent, a hydrophobically modified acid-suppressible polyEPI polyether associative thickener is generated, where EPI represents the residue of an epihalohydrin reagent's or a trihaloalkane reagent's reaction with amines, alcohols, or mercaptans. Thus, the aqueous thickener blend composition may comprise an acid-suppressible associative thickener having a backbone comprising one or more polyoxyalkylene segments greater than 10 oxyalkylene units in length and one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing.

As stated above, at least one of the hydrophobic groups attached to or within the acid-suppressible thickener backbone contains a secondary amine, or a tertiary amine, or a tertiary phosphine, or a combination thereof, and optionally a quaternary amine, that modulates the water solubility of the hydrophobic group, depending on the pH of the aqueous composition containing the thickener.

Herein, a secondary amine is defined as a nitrogen with bonds to only one hydrogen and two carbons, wherein neither of the two adjoining carbons are classified as carbonyls or thionyls. Carbonyls are carbons with a double bond to oxygen. Thus, nitrogen that can be classified as part of amide, urethane or urea groups are not secondary amines. Thionyls are carbons with a double bond to sulfur. The two carbons adjoining the nitrogen radical may have other atoms or groups of atoms, including hydrogen and carbon, bonded to them, with the proviso that at least one of the groups of atoms includes a covalent bond to the thickener backbone. The groups of atoms bonded to the two carbons adjoining the nitrogen radical may connect forming a heterocyclic nitrogen moiety. Optionally, the amine group may be oxidized to the corresponding amine oxide.

Herein, a tertiary amine is defined as a nitrogen with bonds to only two or three carbons wherein the adjoining carbon atoms are not classified as carbonyls or thionyls. Thus, nitrogen that can be classified as part of an amide, urethane or urea group is not a tertiary amine. The two or three carbons adjoining the nitrogen may have other atoms or groups of atoms, including hydrogen and carbon, bonded to them, with the proviso that at least one of the groups of atoms includes a covalent bond to the thickener backbone. The groups of atoms bonded to the two or three carbons adjoining the nitrogen may connect forming a heterocyclic nitrogen moiety. Optionally, the amine group may be oxidized to the corresponding amine oxide.

A quaternary amine is defined as a nitrogen with bonds to four carbons.

Herein a tertiary phosphine is defined as any of several organic compounds having the structure of a tertiary amine as described above, but with phosphorus in place of nitrogen.

The associative mechanism requires a plurality of (i.e., two or more) hydrophobic groups on each hydrophilic backbone to participate in the network structure responsible for viscosity generation. It has been found that the presence of only a single secondary amine, or tertiary amine, or tertiary phosphine, in the associative thickener is sufficient to decrease the thickening efficiency of the thickener at low pH. However, in one embodiment, at least 2, in another embodiment at least 3, and yet another embodiment at least 5 of the hydrophobic groups which comprise secondary amines, or tertiary amines, or tertiary phosphines are present per thickener molecule. By "attached to or within the backbone" of the thickener, we mean these hydrophobic groups may be located within the backbone, pendant to the backbone and/or on chain termini. The term "hydrophobic group" means a group chosen from radicals and polymeric groups comprising at least one hydrocarbon-based chain chosen from linear and branched, saturated and unsaturated hydrocarbon-based chains, which optionally comprise one or more hetero atom, such as P, O, N and S, and radicals comprising at least one chain chosen from perfluoro and silicone chains. When the term "hydrophobic group" means a group chosen from the hydrocarbon radicals, the hydrophobic group comprises at least 6 carbon atoms, preferably 10-24 carbon atoms.

In the aqueous acid-suppressible thickener composition, at least 10%, specifically at least 25%, more specifically at least 50%, and even more specifically at least 80% of the hydrophobic groups have one or more of a secondary amine or a tertiary amine, or a tertiary phosphine functionality.

Examples of reagents and routes that can be used to generate hydrophobic groups comprising at least one secondary amine functionality, or hydrophobic groups comprising at least one tertiary amine functionality, or hydrophobic groups comprising at least one tertiary phosphine functionality, are discussed in U.S. patent application Ser. No. 11/974,071.

In one particularly preferred embodiment, the aqueous thickener blend composition may comprise an acid-suppressible associative thickener having a backbone comprising one or more polyoxyalkylene segments greater than 10 oxyalkylene units in length and wherein the acid-suppressible associative thickener is a hydrophobically modified polyurethane polyether comprising the reaction product of a dialkylamino alkanol with a multi-functional isocyanate, a polyether diol, and optionally a polyether triol. Preferably, the polyether diol has a weight average molecular weight between 2,000 and 12,000, preferably between 6,000 and 10,000.

This type of HEUR associative thickener can be readily blended with HASE or ASE thickeners to provide a low viscosity aqueous blend of HEUR and HASE or ASE thickeners, which can be used to effectively increase the viscosity of aqueous polymer systems, such as paints, coatings, and adhesives.

Thus, a preferred method to increase the viscosity of an aqueous polymer system comprises: (a) combining the aqueous polymer system with an aqueous thickener blend composition, wherein the aqueous thickener blend composition comprises: A) an aqueous acid-suppressible associative thickener polymer composition comprising, based on the weight of the aqueous acid-suppressible thickener composition: (i) 1% to 60% by weight of an acid-suppressible associative HEUR thickener having a backbone comprising one or more polyoxyalkylene segments greater than 10 oxyalkylene units in length, said acid-suppressible associative HEUR thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine, wherein the acid-suppressible associative HEUR thickener is a hydrophobically modified polyurethane polyether comprising the reaction product of a dialkylamino alkanol with a multi-functional isocyanate, a polyether diol having a weight average molecular weight between 2,000 and 12,000, preferably between 6,000 and 10,000, and optionally a polyether triol; (ii) sufficient acid to substantially protonate the secondary amine, or the tertiary amine, or the tertiary phosphine, or combination thereof; (iii) 40% to 99% by weight of water; and (iv) 0% to 15% by weight of an organic co-solvent, surfactant, cyclodextrin compound, or any combination thereof, as a viscosity-suppressing additive; and B) a HASE or ASE thickener; and (b) adding an amount of a base sufficient to substantially deprotonate the protonated secondary amine, or protonated tertiary amine, or protonated tertiary phosphine, or combination thereof.

In another preferred embodiment, the aqueous thickener blend composition may comprise an acid-suppressible associative thickener having a backbone comprising one or more polyoxyalkylene segments greater than 10 oxyalkylene units in length and wherein the acid-suppressible associative thickener is a hydrophobically modified polyurethane polyether comprising the reaction product of an epoxy-amine adduct with a multi-functional isocyanate, and a polyether diol, said epoxy-amine adduct derived from the reaction of primary or secondary amines with mono- or di-glycidyl ether derivatives or other mono- or di-epoxy derivatives. Preferably, the polyether diol has a weight average molecular weight between 2,000 and 12,000, preferably between 6,000 and 10,000.

Thus, a preferred method to increase the viscosity of an aqueous polymer system comprises: (a) combining the aqueous polymer system with an aqueous thickener blend composition, wherein the aqueous thickener blend composition comprises: A) an aqueous acid-suppressible associative thickener polymer composition comprising, based on the weight of the aqueous acid-suppressible thickener composition: (i) 1% to 60% by weight of an acid-suppressible associative HEUR thickener having a backbone comprising one or more polyoxyalkylene segments greater than 10 oxyalkylene units in length, said acid-suppressible associative HEUR thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine, wherein the acid-suppressible associative HEUR thickener is a hydrophobically modified polyurethane polyether comprising the reaction product of an epoxy-amine adduct with a multi-functional isocyanate, and a polyether diol having a weight average molecular weight between 2,000 and 12,000, preferably between 6,000 and 10,000, said epoxy-amine adduct derived from the reaction of primary or secondary amines with mono- or di-glycidyl ether derivatives or other mono- or di-epoxy derivatives; (ii) sufficient acid to substantially protonate the secondary amine, or the tertiary amine, or the tertiary phosphine, or combination thereof; (iii) 40% to 99% by weight of water; and (iv) 0% to 15% by weight of an organic co-solvent, surfactant, cyclodextrin compound, or any combination thereof, as a viscosity-suppressing additive; and B) a HASE or ASE thickener; and (b) adding an amount of a base sufficient to substantially deprotonate the protonated secondary amine, or protonated tertiary amine, or protonated tertiary phosphine, or combination thereof.

Not all of the hydrophobic groups in the associative acid-suppressible thickener are required to comprise secondary amines or tertiary amines or tertiary phosphines. Examples of reagents that can be used to form the hydrophobic groups not comprising secondary amines or tertiary amines or tertiary phosphines are also discussed in U.S. patent application Ser. No. 11/974,071.

Organic or inorganic acids can be used for protonating the amine functionality in the acid-suppressible associative thickener. Suitable acids include, for example, phosphoric acid, acetic acid, hydrochloric acid, sulfuric acid, citric acid, carbonic acid, ascorbic acid, glycolic acid, isoascorbic acid, adipic acid, succinic acid, oxalic acid, homopolymers and copolymers of acrylic acid, homopolymers and copolymers of methacrylic acid, homopolymers and copolymers of maleic anhydride, homopolymers and copolymers of styrenesulphonate, homopolymers and copolymers of 2-acrylamido-2-methylpropane sulfonic acid, polyphosphoric acid, homopolymers and copolymers of phosphoethylmethacrylate, alpha hydroxy acids and trans-cinnamic acid. Phosphoric acid and polyacrylic acid with a molecular weight between 1000 and 5000 are preferred.

The acid-suppressible thickener and acid are combined to provide an aqueous thickener composition. As used herein, the term "aqueous thickener composition" (or "aqueous thickener polymer composition" or "aqueous associative thickener composition" or aqueous acid-suppressible thickener composition) refers to a composition that is provided predominantly in water rather than organic solvent, although a minor amount of a water-miscible organic solvent can be present. The acid-suppressible thickener and acid are combined with a HASE or ASE thickener to provide an aqueous thickener blend composition. Similarly, the term "aqueous thickener blend composition" refers to a composition that is provided predominantly in water rather than organic solvent, although a minor amount of a water-miscible organic solvent can be present. Preferably the aqueous thickener composition or aqueous thickener blend composition comprises less than 5 weight % water miscible solvent, more preferably less than 2 weight % water miscible solvent, and most preferably, less than 1 weight % water miscible solvent, based on the weight of the aqueous thickener (blend) composition. In one embodiment, no organic solvent is present in the aqueous thickener (blend) composition.

The aqueous thickener blend composition can further comprise other optional additives useful to decrease the viscosity of the composition. The embodiment is especially useful where the amine or phosphine functionalities are not completely protonated, that is, where it is desired to adjust the pH of the composition to be in the higher end of the pH range of 2.5 to 6. Suitable viscosity suppressing additives include, for example, surfactants such as dialkylsulfosuccinates, sodium lauryl sulfate, alkyl ethoxylates and alkylarylethoxylates; cyclodextrin compounds such as cyclodextrin (which includes α-cyclodextrin, α-cyclodextrin, and γ-cyclodextrin), cyclodextrin derivatives, cycloinulohexose, cycloinuloheptose, cycloinulo-octose, calyxarene, and cavitand. "Cyclodextrin derivatives" refer to α-cyclodextrins, β-cyclodextrins, and γ-cyclodextrins in which at least one hydroxyl group located on the rim of the cyclodextrin ring has been functionalized with a substituent group such as methyl, acetyl, hydroxypropyl, hydroxyethyl group. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-α-cyclodextrin and hydroxypropyl-α-cyclodextrin, in particular methyl-α-cyclodextrin. Since surfactants degrade the effectiveness of the cyclodextrin compound in reducing viscosity, it is preferred that surfactants not be employed when a cyclodextrin compound is added to the aqueous thickener polymer composition.

In an embodiment for the preparation of the aqueous thickener blend composition, the acid-suppressible associative thickener of the types described above is first dissolved or dispersed in water with no added acid; sufficient acid is then added such that the amount of acid is sufficient to adjust the pH of the aqueous thickener composition to a pH of 2.5 to 6. In another embodiment, the acid or some portion of the total acid is first pre-mixed with water, then the acid-suppressible associative thickener polymer is subsequently dissolved or dispersed with stirring or agitation into the acid and water mixture, and if necessary, additional acid is added. The HASE or ASE thickener, and other additives, e.g., water miscible organic solvents or cyclodextrin compounds can be incorporated into the compositions at any point.

In an advantageous feature, the aqueous associative thickener blend compositions may be pourable at 25° C. The composition can have a viscosity of 500 cps to 15,000 cps, specifically less than 10,000 cps, even more specifically less than 5,000 cps. In a specific embodiment, the compositions are pourable without addition of any organic solvent and/or other viscosity-reducing additive, e.g., a cyclodextrin compound.

In still another advantageous feature, the aqueous associative thickener blend compositions can be formulated to contain a wide range of solids content. For example, the aqueous associative thickener blend composition can comprise 1 weight % to 60 weight % thickener solids, specifically 5 weight % to 40 weight % thickener solids, even more specifically 15 weight % to 25 weight % thickener solids, based on the total weight of the aqueous associative thickener blend composition. The compositions further comprise 40 weight % to 99 weight % aqueous solution, specifically 60 weight % to 95 weight % aqueous solution, even more specifically 75 weight % to 85 weight % aqueous solution, based on the total weight of the aqueous associative thickener blend composition. As stated above, the "aqueous solution" can comprise up to 5 weight percent of a water-miscible organic solvent. The optional additives used to further decrease the viscosity of the composition can be present in an amount of 0 weight % to 15 weight %, specifically 1 weight % to 10 weight %, even more specifically 1 weight % to 3 weight %, based on the total weight of the aqueous associative thickener blend composition.

Mixing techniques to incorporate the aqueous associative thickener blend in the aqueous composition to be thickened include conventional mixing equipment such as mechanical lab stirrers, high speed dispersers, ball mills, sand mills, pebble mills, and paddle mixers. The aqueous associative thickener blend composition can be incorporated into aqueous polymer compositions in amounts from 0.005 weight % to 20 weight %, preferably from 0.01 weight % to 10 weight %, and most preferably from 0.05 weight % to 5 weight %, based on the weight of the aqueous composition.

Typical aqueous polymer systems in which the aqueous associative thickener blend compositions are added include paints, such as latex paints; dispersed pigment grinds; coatings, including decorative and protective coatings; wood stains; cosmetics, personal care items such as, for example, shampoos, hair conditioners, hand lotions, hand creams, astringents, depilatories, and antiperspirants; adhesives; sealants; inks; cementitious coatings; joint compounds and other construction materials; drilling fluids; topical pharmaceuticals; cleaners; fabric softeners; pesticidal and agricultural compositions; paper or paperboard coating formulations; textile formulations; and non-woven formulations.

In one embodiment, the aqueous polymer system to be thickened is a latex composition. A latex composition contains discrete polymer particles dispersed in an aqueous medium. Examples of such latex compositions include latex emulsion polymers, including but not limited to polymers that comprise (meth)acrylates, styrene, vinyl acetate or other ethylenically unsaturated monomers; latex paints; pre-blend formulations for paints or coatings; textile formulations; nonwoven formulations; leather coatings; paper or paperboard coating formulations; and adhesives.

In another embodiment, the aqueous associative thickener blend composition may be supplied at the lower pH, such that the amine or phosphine groups are protonated as described above, together with a latex emulsion polymer or other aqueous polymer system. The pH may be raised in a further formulating step, which may include, for example, the addition of an amount of base sufficient to substantially deprotonate the protonated amine or phosphine groups of the acid-suppressible associative thickener polymer, and thereby effect an increase in viscosity. Thus, advantageously, a latex emulsion polymer is supplied together with the latent acid-suppressible thickener, or the blend of thickeners, and is later formulated into an aqueous paint composition providing the desired increase in viscosity during formulation of the paint. A specific advantage that is recognized in this and related embodiments is the provision of a pre-formulated emulsion comprising latent thickeners and the emulsion, especially where the latter is normally supplied at low pH. Examples of such emulsions include polyvinyl acetate polymers, or copolymers of vinyl acetate.

Optionally, the aqueous polymer compositions may comprise other components, such as pigments, fillers, and extenders such as, for example, titanium dioxide, barium sulfate, calcium carbonate, clays, mica, talc, and silica; surfactants; salts; buffers; pH adjustment agents such as bases and acids; biocides; mildewcides; wetting agents; defoamers; dispersants; pigments; dyes; water miscible organic solvents; antifreeze agents; corrosion inhibitors; adhesion promoters; waxes; crosslinking agents; and other formulation additives known in the art. Advantageously, the acid-suppressible associative thickener and the inventive thickener blends show good performance in formulated systems, such as paints, that include a colorant.

EXAMPLES

The following examples are presented to illustrate the process and the composition of the invention. These examples are intended to aid those skilled in the art in understanding the present invention. The present invention is, however, in no way limited thereby.

The following abbreviations are used in the examples:

| | |
|---|---|
| HMDI | 4,4'-Methylene bis(cyclohexyl isocyanate) |
| PEG | polyethylene glycol |
| HEUR | hydrophobically modified ethylene oxide urethane polymer |
| HASE | hydrophobically modified alkali soluble or alkali swellable emulsion |
| ASE | alkali soluble or alkali swellable emulsion |
| SEC | size exclusion chromatography |
| HPLC | high pressure liquid chromatography |
| Mw | weight average molecular weight |
| Mn | number average molecular weight |

The weight average molecular weights (Mw) of the acid-suppressible associative thickeners were determined using size exclusion chromatography (SEC). The separations were carried out at room temperature on a liquid chromatograph consisting of an Agilent 1100 Model isocratic pump and autoinjector (Waldbronn, Germany), and a Polymer Laboratories ELS-1000 Model evaporative light scattering detector (Polymer Laboratories, International, Ltd., Church Stretton, UK). The detector was operated with a 140° C. nebulizer, a 180° C. evaporator, and a 1.5 liter$^2$/minute gas flow rate. System control, data acquisition, and data processing were performed using version 3.0 of Cirrus® software (Polymer Laboratories, Church Stretton, UK). Samples were prepared in N,N-dimethylacetamide (DMAc, HPLC grade) at concentrations of 2 milligram/milliliter (mg/ml), shaken for 6 hours at 80° C., and filtered using 0.45 micron polytetrafluoroethylene (PTFE) filter. The SEC separations were performed in DMAc (HPLC grade) at 0.5 milliliter/minute (ml/min) using a SEC column set comprised of three PLgel™ columns (300× 7.5 mm ID) packed with polystyrene-divinylbenzene gel (pore size marked as 100 Å, 10$^3$ Å and 10$^4$ Å, particle size 5 microns) purchased from Polymer Laboratories (Church Stretton, UK). The injection volume was 100 microliters (ul) of sample solution at a concentration of 2 mg/ml. The molar mass characteristics of the analyzed samples were calculated based on polyethylene glycol/oxide (PEG/PEO) standards also purchased from Polymer Laboratories (Church Stretton, UK).

Dispersions of thickener in water were produced by weighing solid dry polymer and water into 50 milliliter (mL) plastic centrifuge tubes. The tubes were capped and mounted on a rotator for continuous tumbling over 48 hours. Once homogeneous, the samples were equilibrated in a 25° C. water bath just prior to measuring pH and viscosity on a Brookfield DV-II+ LV viscometer. Aqueous sample pH values were measured on a Corning pH Meter Model 430 (Corning Incorporated, Corning, N.Y., USA). The pH meter was calibrated with pH=7.0 and pH=4.0 buffer solutions from Fisher Scientific (Fair Lawn, N.J., USA).

Example 1

Synthesis of Acid-Suppressible HEUR Thickener, Ex. 1

A mixture of 400.0 g PEG (molecular weight 8000) and 650.0 g toluene was dried by azeotropic distillation. The mixture was cooled to 90° C., and 40.17 g HMDI and 0.42 g dibutyltin dilaurate were added. After 1 hour at 90° C. with stirring, the reaction mixture was cooled to 80° C. A mixture of 53.93 g bis(2-ethylhexyl)aminoethanol and 3.42 g hexanol was then added to the reactor followed by stirring the mixture at 80° C. for one hour. After cooling to room temperature, the resulting solid polymer was isolated via precipitation from hexanes and vacuum filtration.

Example 2

Viscosities of Thickeners Used in Thickener Blends

The data in Table 1 (below) give the viscosities of the thickeners used in the thickener blends (Brookfield viscosity, cps). SCT-275 and RM-825 are commercial HEUR thickeners (Rohm and Haas Company, Philadelphia, Pa., USA); RM-5 and ASE-60 are commercial HASE thickeners (Rohm and Haas Company, Philadelphia, Pa., USA); and Ex. 1 is an acid-suppressible thickener (Example 1, above).

TABLE 1

Thickener Viscosity (at 25° C.)

| | \multicolumn{5}{c}{Thickeners} | | | | |
|---|---|---|---|---|---|
| | Ex. 1 | RM-5 | ASE-60 | SCT-275 | RM-825 |
| pH | 3.22 | 2.35 | 2.86 | 5.95 | 6.03 |
| Brookfield, cps LV | 5590 | 10.6 | 11.1 | 2610 | 1310 |
| Speed | 60 | 60 | 60 | 60 | 60 |
| Spindle | 4 | 1 | 1 | 4 | 4 |

Example 3

Viscosities of Thickener Blends

Blends of different thickener types were prepared as shown in Table 2 below, and the blends were mixed for 10 minutes using a laboratory bench top stirrer, except in those cases where the blend mixture gelled. In these cases, the blends (blends M1, M2, M5, and M6) gelled in less than 3 minutes. Viscosities were measured on a Brookfield viscometer at 25° C., using spindle #4 at a speed of 60 rpm.

TABLE 2

Viscosity of Thickener Blends

| | \multicolumn{5}{c}{Thickeners} | |
|---|---|---|---|---|---|---|
| | SCT-275 (HEUR) | RM-825 (HEUR) | Ex. 1 (Ex. 1) | RM-5 (HASE) | ASE-60 (ASE) | Blend Viscosity (LV Brookfield, cps) |
| Blend M1 | | | | | | |
| wet grams | 15.38 | 0 | 0 | 55.46 | 0 | |
| active grams | 2.69 | 0 | 0 | 16.64 | 0 | Gelled |
| Blend M2 | | | | | | |
| wet grams | 0 | 20.98 | 0 | 55.56 | 0 | |
| active grams | 0 | 5.25 | 0 | 16.67 | 0 | Gelled |
| Blend M3 | | | | | | |
| wet grams | 0 | 0 | 55.65 | 55.22 | 0 | |
| active grams | 0 | 0 | 10.02 | 16.56 | 0 | 3840 |
| Blend M4 | | | | | | |
| wet grams | 0 | 0 | 55.18 | 0 | 59.25 | |
| active grams | 0 | 0 | 9.93 | 0 | 16.59 | 3360 |
| Blend M5 | | | | | | |
| wet grams | 15.29 | 0 | 0 | 0 | 59.60 | |
| active grams | 2.68 | 0 | 0 | 0 | 16.69 | Gelled |
| Blend M6 | | | | | | |
| wet grams | 0 | 21.02 | 0 | 0 | 59.48 | |
| active grams | 0 | 5.26 | 0 | 0 | 16.65 | Gelled |
| Blend M7 | | | | | | |
| wet grams | 0 | 0 | 40.78 | 2.71 | 0 | |
| active grams | 0 | 0 | 7.34 | 0.81 | 0 | 4710 |
| Blend M8 | | | | | | |
| wet grams | 0 | 0 | 7.48 | 40.32 | 0 | |
| active grams | 0 | 0 | 1.35 | 12.1 | 0 | 1010 |

The blends of HEUR thickener with HASE thickener (M1 and M2) both gelled quickly and would not find utility as a commercial blend of thickeners. The blends of HEUR thickener with ASE thickener (M5 and M6) gelled similarly. However, the inventive thickener blends (acid suppressible thickener with HASE thickener, Blends M3, M7 and M8; and acid-suppressible thickener with ASE thickener, M4) have lower viscosities than the initial viscosity of the acid-suppressible thickener. The inventive thickener blends are compatible and are readily pourable.

Example 4

Performance of Thickener Blend in Aqueous Paint Formulation

The performance obtained by the use of the inventive thickener blend comprising the acid-suppressible thickener and a HASE thickener (Blend M3) is demonstrated in a latex paint composition. A latex paint composition, Pre-paint #1, was prepared by combining the following components:

| | |
|---|---|
| Kronos 4311 titanium dioxide slurry | 54.04 g |
| Orotan 731A | 0.14 g |

-continued

| | |
|---|---|
| Water | 40.55 g |
| Propylene glycol | 4.89 g |
| Ropaque Ultra plastic pigment | 10.10 g |
| Rhoplex SG-30 binder | 83.36 g |
| Texanol coalescent | 3.25 g |
| Triton CF-10 | 0.20 g |
| Byk 024 | 0.35 g |
| Ammonia (29.29%) | 1.53 g |
| Kathon LX (1.5%) | 0.34 g |
| Total | 198.75 g |

Kronos 4311 is a product of Kronos Incorporated (Chelmsford, Mass., USA). Orotan™ 731A, Ropaque™ Ultra, Rhoplex™ SG-30, and Kathon™ LX are products of Rohm and Haas Company (Philadelphia, Pa., USA). Triton™ CF-10 is a product of Dow Chemical Company (Midland, Mich., USA). Texanol™ is a product of Eastman Chemical Company (Kingsport, Tenn., USA). Byk 024 is a product of Byk Chemie (Wesel, Germany).

"KU viscosity" is a measure of the mid-shear viscosity as measured by a Krebs viscometer. The Krebs viscometer is a rotating paddle viscometer that is compliant with ASTM-D562. KU viscosity was measured on a Brookfield Krebs Unit Viscometer KU-1+ available from Brookfield Engineering Labs (Middleboro, Mass., USA). "KU" shall mean Krebs unit.

"ICI viscosity" is the viscosity, expressed in units of poise, measured on a high shear rate, cone and plate viscometer known as an ICI viscometer. An ICI viscometer is described in ASTM D4287. It measures the viscosity of a paint at approximately 10,000 sec$^{-1}$. ICI viscosities of paints were measured on a viscometer manufactured by Research Equipment London, Ltd (London, UK). An equivalent ICI viscometer is the Elcometer 2205 manufactured by Elcometer, Incorporated (Rochester Hills, Mich., USA). The ICI viscosity of a paint typically correlates with the amount of drag force experienced during brush application of the paint.

Pre-paint #1 had a viscosity of less than 55 KU (and the ICI viscosity cannot be reliably obtained for such low viscosities). The formulated paint was obtained by adding 5.72 g of inventive thickener blend, Blend M3, to 198.75 g of Pre-paint #1 and stirring on a laboratory mixer for ten minutes. The pH of the fully formulated paint was 9.5. Following a 24 hour equilibration at room temperature, the thickened paint was stirred for one minute on a laboratory mixer before measuring viscosity values (at 25° C.). The thickened paint formulation comprising the inventive thickener blend, Blend M3, had a KU viscosity of 101.4 KU and an ICI viscosity of 0.80 poise, showing that the thickener performance in the formulated latex paints was comparable to that of commercially available thickeners.

Example 5

Colorant Acceptance of Paints Comprising Thickener Blend

The white paint formulated with the inventive thickener blend above was color tinted by adding 11.5 g of Colortrend® phthalo blue colorant to 114.1 g of base paint followed by mixing on a paint shaker for 10 minutes. The phthalo blue colorant was obtained from Degussa Corp./Creanova Inc. (Parsippany, N.J., USA). The pH was 9.3. The KU and ICI viscosities were measured one hour after tinting (at 25° C.). The viscosity measurement was preceded by one minute of stirring on a mechanical mixer. The phthalo blue tinted paint exhibited KU and ICI viscosities of 94.2 and 0.50, respectively, showing acceptable performance in formulations with added colorant.

The singular forms "a," "an," and "the" include plural referents unless the context clearly dictates otherwise. Unless defined otherwise, technical and scientific terms used herein have the same meaning as is commonly understood by one skilled in the art. The endpoints of all ranges directed to the same component or property are inclusive of the endpoint and independently combinable. As used herein, the term "(meth) acrylic" encompasses both acrylic and methacrylic. Similarly, the term "poly(meth)acrylamide" encompasses both polyacrylamide and polymethacrylamide.

As described earlier herein, the acid-suppressible associative thickener of this thickener blend invention preferably has a non-ionic water soluble backbone. The addition of minor amounts of ionic groups in the backbone of the acid-suppressible associative thickener is also contemplated. Minor amounts of ionic groups are less than 20 weight percent, and more preferably less than 5 weight percent, of ionic monomer units based on the total weight of backbone monomer units. Thus, the acid-suppressible associative thickener of the inventive blends may have a substantially non-ionic water soluble backbone and still be considered a non-ionic water soluble backbone.

All cited documents are incorporated herein by reference.

What is claimed is:

1. An aqueous thickener blend composition comprising:
   A) An aqueous acid-suppressible associative thickener polymer composition comprising, based on the weight of the aqueous acid-suppressible thickener composition:
      (a) 1% to 60% by weight of an acid-suppressible associative thickener having a backbone comprising a polyoxyalkylene, a polysaccharide, or a polyvinyl alcohol, said acid-suppressible associative thickener further comprising a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, tertiary amine, and tertiary phosphine are defined such that the carbon atoms adjacent to nitrogen or phosphorus are not classified as carbonyl or thionyl carbons;
      (b) sufficient acid to substantially protonate the secondary amine, or the tertiary amine, or the tertiary phosphine, or combination thereof;
      (c) 40% to 99% by weight of water; and
      (d) 0% to 15% by weight of an organic co-solvent, surfactant, cyclodextrin compound, or any combination thereof, as a viscosity-suppressing additive; and
   B) A thickener selected from the group consisting of an hydrophobically modified alkali soluble or alkali swellable thickener (HASE), an alkali soluble or alkali swellable thickener without hydrophobic modification (ASE), and mixtures thereof.

2. The composition of claim 1, wherein the acid-suppressible associative thickener has a backbone comprising one or more polyoxyalkylene segments greater than 10 oxyalkylene units in length.

3. The composition of claim 1, wherein the acid-suppressible associative thickener has a backbone comprising one or more saccharide segments greater than 10 saccharide units in length.

4. The composition of claim 2, wherein the said backbone of the acid-suppressible associative thickener further comprises one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing.

5. The composition of claim 2, wherein the acid-suppressible associative thickener is a hydrophobically modified polyurethane polyether comprising the reaction product of a dialkylamino alkanol with a multi-functional isocyanate, a polyether diol having a weight average molecular weight between 2,000 and 12,000, and optionally a polyether triol.

6. The composition of claim 2, wherein the acid-suppressible associative thickener is a hydrophobically modified polyurethane polyether comprising the reaction product of an epoxy-amine adduct with a multi-functional isocyanate, and a polyether diol having a weight average molecular weight between 2,000 and 12,000, said epoxy-amine adduct derived from the reaction of primary or secondary amines with mono- or di-glycidyl ether derivatives or other mono- or di-epoxy derivatives.

7. The composition of claim 1, wherein the amount of acid is sufficient to adjust the pH of the composition to a pH of 2.5 to 6.0.

8. An aqueous thickener blend composition comprising:
A) An aqueous acid-suppressible associative thickener polymer composition comprising, based on the weight of the aqueous acid-suppressible thickener composition:
   (a) 1% to 60% by weight of an acid-suppressible associative thickener comprising a substantially non-ionic water soluble backbone and a plurality of hydrophobic groups attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, tertiary amine, and tertiary phosphine are defined such that the carbon atoms adjacent to nitrogen or phosphorus are not classified as carbonyl or thionyl carbons;
   (b) sufficient acid to substantially protonate the secondary amine, or the tertiary amine, or the tertiary phosphine, or combination thereof;
   (c) 40% to 99% by weight of water; and
   (d) 0% to 15% by weight of an organic co-solvent, surfactant, cyclodextrin compound, or any combination thereof, as a viscosity-suppressing additive; and
B) A thickener selected from the group consisting of an hydrophobically modified alkali soluble or alkali swellable thickener (HASE), an alkali soluble or alkali swellable thickener without hydrophobic modification (ASE), and mixtures thereof.

9. The composition of claim 8, wherein the substantially non-ionic water soluble backbone of the aqueous acid-suppressible associative thickener polymer composition further comprises a polyoxyalkylene, or a poly(meth)acrylamide, or a polysaccharide, or a polyvinyl alcohol, or a copolymer comprising esters of (meth)acrylic acid.

10. A method to increase the viscosity of an aqueous polymer system, comprising
(a) combining the aqueous polymer system with an aqueous thickener blend composition, wherein the aqueous thickener blend composition comprises:
   A) an aqueous acid-suppressible associative thickener polymer composition comprising, based on the weight of the aqueous acid-suppressible thickener composition:
      (i) 1% to 60% by weight of an acid-suppressible associative thickener having a backbone comprising a polyoxyalkylene, a polysaccharide, or a polyvinyl alcohol, said acid-suppressible associative thickener further comprising a plurality of hydrophobic groups attached to or within the backbone wherein one or more of said hydrophobic groups comprises a secondary amine, or a tertiary amine, or a tertiary phosphine, or a combination thereof; and optionally a quaternary amine, with the proviso that less than 80% of the total amine functionality is a quaternary amine; wherein the secondary amine, tertiary amine, and tertiary phosphine are defined such that the carbon atoms adjacent to nitrogen or phosphorus are not classified as carbonyl or thionyl carbons;
      (ii) sufficient acid to substantially protonate the secondary amine, or the tertiary amine, or the tertiary phosphine, or combination thereof;
      (iii) 40% to 99% by weight of water; and
      (iv) 0% to 15% by weight of an organic co-solvent, surfactant, cyclodextrin compound, or any combination thereof, as a viscosity-suppressing additive; and
   B) A thickener selected from the group consisting of an hydrophobically modified alkali soluble or alkali swellable thickener (HASP), an alkali soluble or alkali swellable thickener without hydrophobic modification (ASP), and mixtures thereof; and
(b) adding an amount of a base sufficient to substantially deprotonate the protonated secondary amine, or protonated tertiary amine, or protonated tertiary phosphine, or combination thereof.

11. A polymer composition, comprising in admixture,
(a) an aqueous polymer system; and
(b) an aqueous thickener blend composition comprising:
   A) an aqueous acid-suppressible associative thickener polymer composition comprising, based on the weight of the aqueous acid-suppressible thickener composition:
      (i) 1% to 60% by weight of an acid-suppressible associative thickener having a backbone comprising a polysaccharide, or a polyvinyl alcohol, said acid-suppressible associative thickener further comprising a plurality of hydrophobic groups attached to or within the backbone wherein one or more of said hydrophobic groups comprises a secondary amine, or a tertiary amine, or a tertiary phosphine, or a combination thereof; and optionally a quaternary amine, with the proviso that less than 80% of the total amine functionality is a quaternary amine; wherein the secondary amine, tertiary amine, and tertiary phosphine are defined such that the carbon atoms adjacent to nitrogen or phosphorus are not classified as carbonyl or thionyl carbons;
      (ii) 40% to 99% by weight of water; and (iii) 0% to 15% by weight of an organic co-solvent, surfactant, cyclodextrin compound, or any combination thereof;

wherein the secondary amine, or the tertiary amine, or the tertiary phosphine, or combination thereof, are substantially unprotonated; and B) A thickener selected from the group consisting of an hydrophobically modified alkali soluble or alkali swellable thickener (HASP), an alkali soluble or alkali swellable thickener without hydrophobic modification (ASP), and mixtures thereof.

12. A polymer composition, comprising in admixture, (1) an aqueous polymer system; and (2) an aqueous thickener blend composition comprising:

A) an aqueous acid-suppressible associative thickener polymer composition comprising, based on the weight of the aqueous acid-suppressible thickener composition:

(a) 1% to 60% by weight of an acid-suppressible associative thickener having a backbone comprising a polyoxyalkylene segment greater than 10 oxyalkylene units in length and one or more segments selected from (i) a urethane segment, (ii) a urea segment, (iii) an ester segment, (iv) an ether segment, (v) an acetal segment, (vi) a ketal segment, (vii) an aminoplast segment, (viii) a segment comprising the residue of the reaction of an epihalohydrin with an alcohol, an amine, or a mercaptan, and (ix) a segment comprising the residue of the reaction of a trihaloalkane with an alcohol, an amine, or a mercaptan, and (x) combinations of the foregoing, or wherein the acid-suppressible associative thickener is a hydrophobically modified cellulosic polymer; said acid-suppressible associative thickener further comprising a plurality of hydrophobic groups all attached to or within the backbone wherein one or more of said hydrophobic groups comprises a secondary amine, or a tertiary amine, or a tertiary phosphine, or a combination thereof, and optionally a quaternary amine, with the proviso that less than 80% of the total amine functionality is a quaternary amine; wherein the secondary amine, tertiary amine, and tertiary phosphine are defined such that the carbon atoms adjacent to nitrogen or phosphorus are not classified as carbonyl or thionyl carbons;

(b) 40% to 99% by weight of water; and (c) 0% to 15% by weight of an organic co-solvent, surfactant, cyclodextrin compound, or any combination thereof;

wherein the secondary amine, or the tertiary amine, or the tertiary phosphine, or combination thereof, are substantially unprotonated; and B) A thickener selected from the group consisting of an hydrophobically modified alkali soluble or alkali swellable thickener (HASE), an alkali soluble or alkali swellable thickener without hydrophobic modification (ASE), and mixtures thereof.

* * * * *